United States Patent [19]

Rögner et al.

[11] Patent Number: 4,633,987
[45] Date of Patent: Jan. 6, 1987

[54] PRESSURE-MEDIUM ACTUATED SHIFTING ARRANGEMENT

[75] Inventors: Horst Rögner, Immenstaad; Roland Schacherer, Geisingen; Gerold Bieber, Langenargen, all of Fed. Rep. of Germany

[73] Assignee: Zahnradfabrik Friedrichshafen AG, Friedshafen, Fed. Rep. of Germany

[21] Appl. No.: 722,221

[22] PCT Filed: Jun. 27, 1984

[86] PCT No.: PCT/EP84/00195
§ 371 Date: Apr. 4, 1985
§ 102(e) Date: Apr. 4, 1985

[87] PCT Pub. No.: WO85/00860
PCT Pub. Date: Feb. 28, 1985

[30] Foreign Application Priority Data

Aug. 12, 1983 [LU] Luxembourg ...... PCT/EP83/00216

[51] Int. Cl.[4] .................. B60K 41/22; B60K 41/04
[52] U.S. Cl. .................. 192/0.092; 74/335; 74/336 R; 74/364; 74/745
[58] Field of Search .................. 192/0.092, 3.63; 74/335, 336 R, 336.5, 364, 745

[56] References Cited

U.S. PATENT DOCUMENTS

| | | | |
|---|---|---|---|
| 2,637,222 | 5/1953 | Balkus | 74/745 |
| 2,931,237 | 4/1960 | Balkus | 74/335 |
| 2,974,766 | 3/1961 | Perkins et al. | 74/355 X |
| 3,093,008 | 6/1963 | Wight | 74/745 X |
| 3,682,013 | 8/1972 | Asbery | 74/335 |
| 3,793,898 | 2/1974 | Espenschied et al. | 74/335 |

FOREIGN PATENT DOCUMENTS

| | | |
|---|---|---|
| 2036858 | 2/1971 | Fed. Rep. of Germany |
| 7802241 | 5/1978 | Fed. Rep. of Germany |
| 1179426 | 1/1970 | United Kingdom |
| 1271229 | 4/1972 | United Kingdom |

OTHER PUBLICATIONS

Herion Handbook, No. 1, Edition 1969, Herion-Werke KG, pp. 44, 45, 46, Taschenbuch.

Primary Examiner—Allan D. Herrmann
Attorney, Agent, or Firm—Karl F. Ross; Herbert Dubno

[57] ABSTRACT

Pressure-medium actuated shifting arrangement for a gear transmission, primarily for a multispeed transmission, in which the speed selection lever performs a movement in accordance with a double H shifting configuration. Within the reach of the driver, in a shift console another transmission shaft is mounted, which is displaced by the speed selection lever for path selection and twisted for gear shifting. The transmission shaft has also cams and valves cooperating with a pressure-medium source over the selection cylinder and shift cylinder mounted to the gear box which actuate a gear-shift-lever shaft, whereby not only the desired shift couplings are put into effect, but also feedback information about the shifting situation in the transmission perceptible by the driver is conveyed. Further safety valves are mounted on the gear-shift-lever shaft which allow the selection movement to take place only in the neutral position and multistep cams are located on the same shaft, which together with 3/2-way valves mounted radially displaceable as pistons arrest the two-position shift cylinder also in the median position. Over the piston assembly an optimal gear or an optimal path, in dependence from the travel parameters, for instance the speed of the vehicle, is offered to the driver for shifting.

12 Claims, 10 Drawing Figures

PRESSURE-MEDIUM ACTUATED SHIFTING ARRANGEMENT

CROSS REFERENCE TO RELATED APPLICATIONS

The present application is a national phase application corresponding to No. PCT/EP84/00195 based, in turn, on a Europatent application No. EP83/00216 also filed as a PCT application on Aug. 12, 1983.

FIELD OF THE INVENTION

The invention relates to a shifting arrangement for a gear transmission, particularly a multispeed transmission, wherein the speed selection lever follows a movement in accordance within a double H shifting configuration and is mounted with the reach of the driver in a shifting console, wherein a transmission shaft is displaced for path selection and is twisted for gear shifting and with means to control valves which direct the pressure medium from a pressure-medium source to each of the selection cylinder mounted on the gear box for path selection and to the shift cylinder for gear shifting, whereby the shifting arrangement also has locking means and devices for perceptible feedback information through which a gear-shifting is prevented when the coupling is still closed and the driver is advised through the speed selection lever about the shift position of the transmission at the moment.

BACKGROUND OF THE INVENTION

In such a shifting arrangement, the path selection takes place through a displacement of the speed selection lever transversely to the direction of travel and the gear shifting forwards and backwards with respect to the travel direction.

In a shifting console mounted within the reach of the driver all transmission functions needed to shift a transmission are established and are transmitted via a pressure medium to the selection- and shifting cylinders mounted on the gearing and acting upon the gear-shift-lever shaft.

Depending on the type of the gear transmission, for instance main transmission only or a main transmission in combination with an auxiliary transmission, or a multispeed transmission with torque path splitting, the demands on such a shifting arangement are very high, since not only must the desired shifting be transmitted via a pressure medium, but also as known in a mechanically shifted gear box, it is necessary to provide feedback information, recognizable by the driver regarding the shifting status in the gear box itself.

Such an arrangement in the form of a pneumatical shifting arrangement is known from British Pat. No. 1 179 426, and has a shifting console with a speed selection lever shiftable in the gear-shifting gate with a double H shifting pattern for eight forward speeds and one reverse speed. The shift locks act upon the manual shift lever depending upon the position of the clutch via two locking cylinders and a rocker shaft and the feedback about the selected path is mechanically released at the shifting cylinder via pilot valves.

Such arrangements can no longer satisfy the requirements of a shifting arrangement in a modern transmission, which needs for the transmission of the selection and shifting alone a large number of conduit connections and are cumbersome from the point of view of manufacturing and tuning.

OBJECT OF THE INVENTION

It is therefore the object of the present invention to provide an improved shifting arrangement and to simplify its construction and service.

SUMMARY OF THE INVENTION

This object is attained in accordance with the invention by providing that the selection and shifting motions are transmitted over each of a couple of three-port, two position (3/2) valves mounted on the shifting console and cooperating with cams on the transmission shaft to each of a three-position selection cylinder and two-position shifting cylinder mounted on the gear transmission, whereby the 3/2 valves are mounted next to each other in axial direction for path selection and in circumferential direction for gear selection. In the supply conduits between each of the 3/2 valves and the three-position selection cylinder a safety valve cooperating with the gear-shift-lever shaft and open for passage only in neutral position is mounted. In each of the two conduits for the two-position shifting cylinder a 3/2 valve cooperating with the cams on the gear-shift-lever shaft is mounted in such way as to facilitate the arresting of the two-position shifting cylinder in a median position.

Due to the mounting of a transmission shaft and of 3/2 valves cooperating therewith in the shifting console within the reach of the driver it is possible to transmit to pressure mediums in a relatively simple manner the desired signals for the intended shiftings, whereby a basically known gear-shift-lever shaft is displaced at the gear box in an equally simple manner over selection- and shifting cylinders. Due to this arrangement, it is also possible to incorporate in a simple way safety devices for the path selection. It is particularly advantageous through a skillful arrangement of the 3/2 valves and the cams on the transmission shaft to convert the five paths of the double H shiftings arrangement to the three paths needed in the main gear box over a three-position selection cylinder, so that the gear-shift-lever shaft requires only one shift finger for the shifting of the gear shift bars. Also, the arrangement of the 3/2 valves on the transmission shaft and the gear-shift lever shaft is advantageous. In connection with the 3/2 valves acting displaceably like positions and each of them cooperating with a cam on the gear-shift-lever shaft it is possible to achieve not only a feedback that can be sensed by the driver, but also the use of a simple two-position shifting cylinder for the three shift positions.

Advantageously, the two 3/2 valves cooperating with the gear-shift-lever shaft and built as displaceable pistons are axially displaceable mounted each in a bore, are pressed each by a compression spring radially towards the outside and are moved radially towards the inside, against the pressure of the spring and towards the cams by the pressure medium passing through the other 3/2 valve. The cams on the gear-shift-lever shaft corresponding to the 3/2 valves can have multiple steps and in the neutral position N both contact elements can rest against the transition section between the each of the inner radial cam sections and the median radial sections of the cam.

The construction in which the 3/2-ways valves are built as radially displaceable pistons in cooperation each with a multistep cam running in circumferential direction on the shift-lever shaft is, considering the performed functions, simple in design and also simple to produce.

The pressure pick-up, when between the two supply conduits to the two-position shifting cylinder an additional two-way valve is mounted, which directs the pressure medium to a piston assembly located on the speed selection lever, the piston assembly blocking the lever in the shifting position until the shifting in the gear box is finished. Between the 3/2-way valves and the two-position shifting cylinder together with the piston arrangement makes it possible to recognize in a simple way in the shift console the end of synchronization and the performed speed selection. With only two 3/2 valves and a cam extending circumferentially on the transmission shaft cooperating therewith it is possible, when the two 3/2-way valves are mounted next to each other in circumferential direction on the transmission shaft and are open for passage only in the neutral position N of the gear-selection lever and when in the respective shifting positions and end positions only the corresponding 3/2 valve cuts off the pressure medium to translate into control pressure at the lever position indicator the relatively complicated displacement of the gear-shift-lever shaft and the three shift positions as well as the synchronization point familiar to the driver like in a purely mechanical shifting arrangement.

According to another feature of the invention in spite of the displacement of the transmission shaft in the paths according to the double H shifting pattern the gear-shift-lever shaft is displaced at the gear transmission by a three-position selection cylinder only in the three paths of the main transmission, whereby for the selection of the median path both piston chambers are pressure-medium actuated. The three-position selection cylinder consists of a housing and a three-part piston whereby the inner piston is rigidly connected with the gear-shift-lever shaft and has axially in the center a collar of a larger diameter limiting two piston bushings mounted axially displaceable on the inner piston blocking each in one displacement direction. The bushings are also prevented from moving each in one displacement direction by a stop ring fastened to the housing and that in the median position, the collar and the stop cover each other in axial direction and that both frontal sides from the inner piston to the frontal housing limit have respectively th same intervals as the intervals between the paths on the gear-shift-lever shaft. This speed-selection arrangement realizes in a simple way the selection functions and the three-position cylinder has, except for the stop ring, only a smooth, not recessed bore.

Two additional 3/2 valves can be mounted on the transmission shaft close to each other in axial direction for interconnecting the auxiliary transmission via an auxiliary shifting cylinder. An additional shift lever for the shift pilot valve of the splitter group is mounted on the speed selection lever which connects the split transmission via a split shifting cylinder. Between the pressure-medium source and the pilot valves in the shift console an additional 3/2 valve is provided which is in passage position only when it is opened by manual coupling actuation.

This construction of the pressure-medium actuated shift is particularly suited for a multispeed transmission, because the auxiliary transmission in a double H shifting configuration and the shifting of the split group can be carried out in the usual manner with a shift lever on the speed selection lever. In transmissions with the known coupling actuation via for instance a foot pedal, a 3/2-way valve is connected in a simple manner to this actuating means, so that the pressure medium for displacement is available only when the coupling is open. A converter bridging coupling can be carried out depending on the pressure existing in the control block after the two-way valve. Thereby the known pressure switch can be eliminated in a WSK-(converter shifting coupling) steering mechanism so that the pressure conduit for the piston assembly at the speed-selection lever is utilized for a second function with simultaneous elimination of the switch valve between the source of the pressure medium and the 3/2-way valve. Finally, it is possible to mount in a simple way in the shift console another piston assembly cooperating with the transmission shaft over an entraining pin, whereby this arrangement, especially in a multiple transmission, provides the driver not only with optimal operation conditions of the gear box, but also facilitates the shifting as a consequence of the possiblity to establish in each case the right speed selection, so that the driver can better concentrate on the operation of his vehicle and is no longer unduly distracted.

BRIEF DESCRIPTION OF THE DRAWING

Further details of the invention are clarified with reference to the accompanying drawing.

The drawing shows.

SPECIFIC DESCRIPTION

Figure 1:
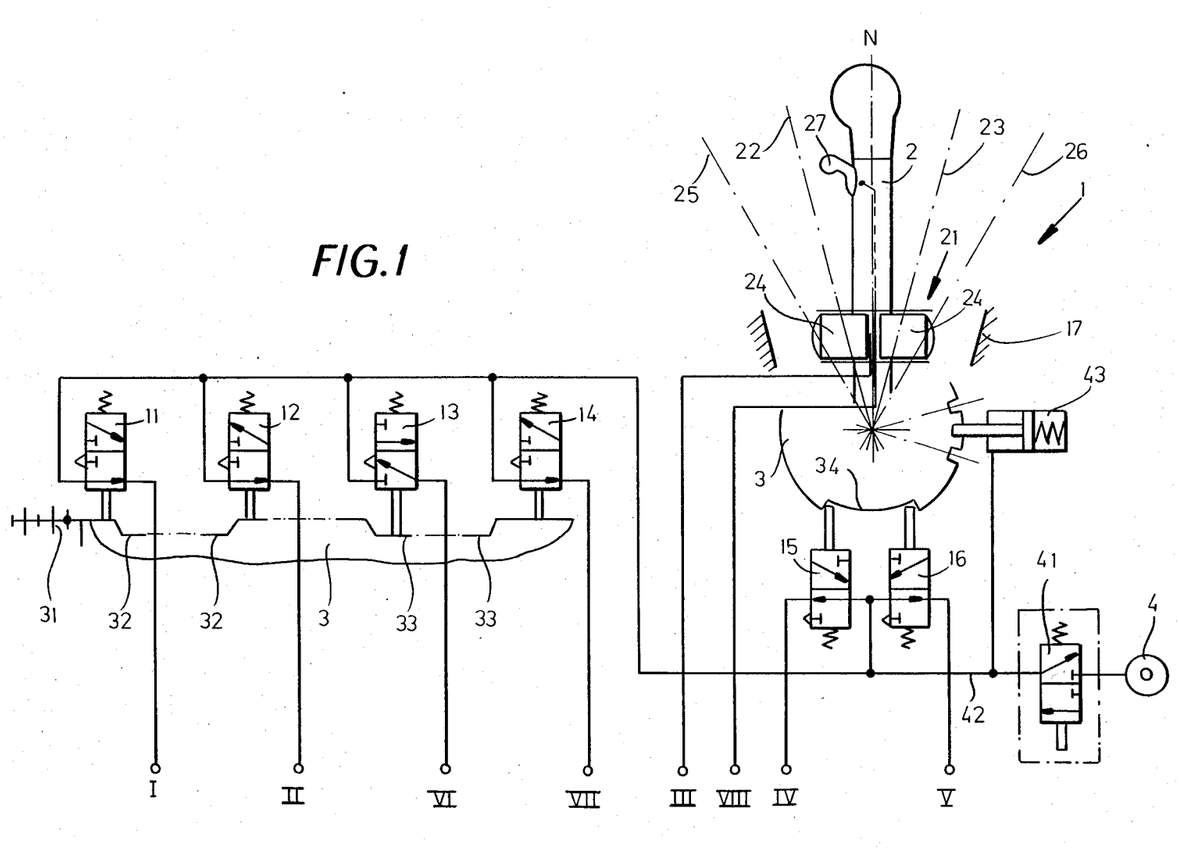
FIG. 1 the shift console with speed selection lever and the 3/2-way valves mounted on the transmission shaft, in schematic representation.

In FIG. 1 a shift console 1, mounted in the driver's compartment of for instance a motor vehicle, with the speed selection-lever 2 of the transmission shaft 3 and all 3/2 valves actuated by the transmission shaft is represented. The 3/2-way valves on the transmission shaft are supplied via a main pressure duct 42 with a pressure medium for instance air from a pressure medium source 4 over a switch valve 41 when a gear transmission 5 is utilized with a main clutch actuated via a clutch pedal by the driver, the supply occuring only then when the clutch is open. The transmission shaft 3, in the case of a multispeed transmission is displaced over the speed-selection lever 2 in for instance five selection positions or parts 31—and in three shift positions—neutral; paths 1, 3, 5, 7; paths R, 2, 4, 6, 8—directly rotationally staggered according to the double H shifting configuration. Through the speed selection movement, the two 3/2 valves 11, 12 located next to each other are displaced by the cam 32 extending in axial direction of the transmission shaft 3 in such a way that the conduits I and II are either activated by the pressure medium or devoid of it, as follows:

| Path position | Conduit I | Conduit II |
|---|---|---|
| R | X | — |
| $\frac{1}{2}$ | X | X |
| $\frac{3}{4}$ | — | X |
| 5/6 | X | X |
| $\frac{7}{8}$ | — | X |

X signifies that the conduit is effective.

When passing from the paths $\frac{3}{4}$ to 5/6 or vice versa, the alternate switching of the 3/2 valves 13, 14 for the switching of the auxiliary gear box 52 over the conduits VI and VII and the auxiliary switching cylinder 55 (FIG. 1A) occurs over a further cam 33. On the transmission shaft 3 in circumferential direction two further 3/2 valves 15, 16 are located, which are actuated by a cam 34 for the speed selection in such manner that in the neutral position N of the speed-selection lever 2 both 3/2 valves 15, 16 are open and the conduits IV and V leading to the control block 7 are actuated by the pressure medium. A locking cylinder 43 is also connected to the main pressure conduit which prevents a displacement of the transmission 3 and thereby of the speed-selection lever 2 in the direction of shifting rotation, whenever the main pressure conduit 42 is emptied of air. In connection with the shifting motion, an additional piston assembly 21 is mounted at the speed-selection lever 2, which is always actuated by pressure medium over the conduit III during a shifting cycle and thereby facilitates the displacement of the speed-selection lever 2 only to the shifting position 22, 23—stop of the respective piston 24 at the housing 17 of the shift console 1—. Only when the shifting in the main transmission 51 is completed and there is no lower pressure in the conduit III, the speed-selection lever 2 can be brought in the corresponding speed-selection end position 25, 26. If the gear transmission has, like in this case, also a split group 53 it is possible to connect also this group— see conduit VIII—over the shift lever 27, the splitter-group shifter valve at and in the speed-selection lever 2.

Figure 1A:
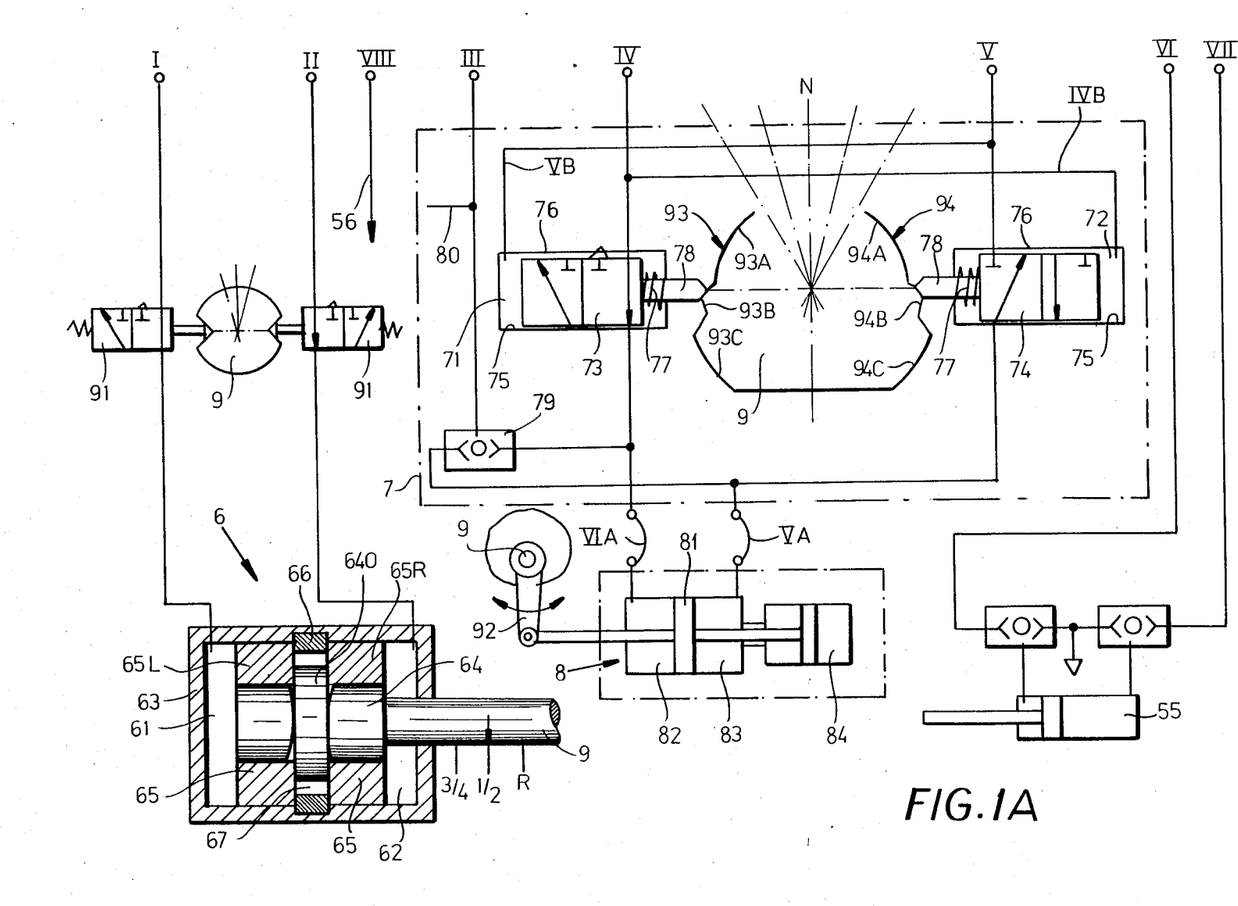
FIG. 1A the devices mounted on the gear transmission especially in the area of the gear-shift-lever shaft, in a schematic representation.

The conduits I to VIII lead directly, respectively over the coupling devices to the assemblies mounted on gear transmission 5, which are shown in FIG. 1A.

Conduit I leads to a piston chamber of a three-position selection cylinder 6, for instance a left one 61, and conduit II leads to the other piston chamber, the right-hand 62, whereby in both conduits a safety valve 91 is mounted in addition. These act together with the gear-shift-lever shaft 9 and are passable only in the neutral position thereof, so that an axial displacement—in the selection direction—of the lever shaft 9 at the gear transmission 5 is possible only in this position.

The three-position selection cylinder 6 comprises a housing 63 an inner piston 64 rigidly connected with the gear-shift-lever shaft and having halfway axially a collar with a larger diameter 640. Two identical piston bushings 65 are arranged to the left and the right of this collar so that they rest against it and are of equal length with the inner piston. In the median position—as represented—on both sides of the inner piston 64 and the piston bushings 65, the piston chambers 61, 62 are frontally arranged, their axial extensions corresponding each to a path interval between the patches $\frac{1}{2}$ to R and $\frac{1}{2}$ and $\frac{3}{4}$, considered on the lever shaft 9.

In the bore with the same diameter in the housing 63 a stop ring 66 having the same width as the collar 640 is mounted at the inner piston 64 axially in the middle and limits the piston bushings 65 in their axial displacement. The free space resulting 67 resulting between the stop ring and the collar is always devoid of air.

The three-position cylinder works as follows:

In the median position—path $\frac{1}{2}$ in the main gear box 51—the switch finger of the gear-shift-lever shaft 9 engages in the connecting rod connected with the rocker arm for the speed-selection coupling $\frac{1}{2}$. Both piston chamber 61, 62 are filled and the median position is established over the piston bushings 65 in connection with the stop ring 66. This shifting situation occurs when the transmission shaft 3 is in the paths $\frac{1}{2}$ and 5/6—see table—. When the piston chamber 62 is emptied of air—path R in the transmission cylinder 3—the inner piston 64 moves to the right until it reaches the stop, whereby the collar 640 entrains the right piston bushing 65R. The gear-shift-lever shaft 9 is in the position of path R.

If in the median position the air is evacuated from the left piston chamber 61, the inner piston is pushed to the left by the pressure in piston chamber 62 until it reaches the stop, whereby the collar 640 entrains the left piston bushing 65L. This shifting situation corresponds to a path position of the transmission shaft of paths $\frac{3}{4}$ and $\frac{7}{8}$ and the gear-shift-lever shaft 9 is in the path $\frac{3}{4}$ of the main transmission. From the five pathes of the transmission shaft 3 the three paths of the main transmission 51 are reached over the three-position cylinder 6 in connection with the cam 32 and both 3/2 valves 11, 12.

The control block 7 consists of the gear-shift-lever shaft 9 on which two multistep cams 93, 94 running circumferentially are provided, each cooperating with one radially displaceable 3/2 valve 73, 74, each of them located in a bore 75 in the housing 76 and each being pressed radially outwardly by a spring 77. Due to the completely displaced 3/2-way valves 73, 74 the conduits IV and IVA and V and VA are connected in a first shifting position to the two-position cylinder 8 or shut off in a second shifting position, while the conduits IVa and Va are emptied of air between the control block and the two-position selection cylinder. The piston chambers 71, 72 of the 3/2-way valves 73, 74 working as pistons are each interconnected with the conduits leading to the other 3/2-way valves (V with 71 over VB; IV with 72 over IVB). A further two-way valve 79 is connected to the conduits IVA and VA whose outlet, the conduit III, as described, supplies with pressure medium the piston assembly 21 (FIG. 1)

The two-position cylinder 8 has a piston 81, two piston chambers 82, 83 as well as dampers 84 working in both end positions, shifting the gear-shift-lever shaft 9 by means of a switch lever 92 in the direction of the runs 1, 3, 5, 7, respectively R, 2, 4, 6, 8 and also in neutral position.

The control block 7 in connection with the two-position cylinder 8 works as follows:

In the neutral position of the speed selection lever 2, the cam 34 running circumferentially on the transmission shaft 3 opens for passage the 3/2 valves 15, 16 so that the conduits IV and V are under pressure. Over the conduits VB the piston chamber 71 and over the conduit IVB the piston chamber 72 are pressurized and both 3/2-way valves 73, 74 acting as pistons are displaced against the pressure of spring 77 in a first interior position, as shown. The contact pins 78 of both 3/2-way valves are in an unsteady position between the respective interior sections of the cam 93A, 94A and the cam sections 93B, 94B, so that in the slightly pendular position of the contact pins 78 in connection with the gear-shift-lever shaft both 3/2-way valves can be alternately opened for passage and this way, over the conduits IVA and VA and the piston chambers 82, 83 the piston 81 can be held in a median position and over the switch lever 92 the gear-shift-lever shaft can be fixed in the marked neutral position. In case of a displacement of the speed selection lever 2 in a switching position 23 corresponding to the gears R, 2, 4, 6,8 the conduit V is emptied of air and via the 3/2-way valve 73 and the conduits IV and IVA, only the piston chamber 82 is further pressurized so that the piston 81 moves to the right-hand end position, whereby the gear-shift-lever shaft 9 is twisted clockwise around the switch lever 92. At the same time, over the shift finger not shown in the drawing the shifter rod, the rocking arm and the shift sleeve pertaining to the path are synchronized and connected for synchronous run. The piston 81 is now in an end position. During this operation, the pressure supply to the piston chamber 82 via the 3/2 valve 73 is ensured, although the contact pin 78 rides against the cam section 93B, because due to the depressurization of the piston chamber 71 this 3/2-way valve takes a second radially outward position. Only after the shifting is performed, when the piston 81 reaches its end position, the piston chamber 82 is also depressurized, due to the action of the cam section 93C via the 3/2 valve. This way the conduit III is also depressurized and the piston assembly 21 releases the shift lever, so that it can be shifted in the gear end position.

The driver is going now to reactivate the coupling, whereby the pilot valve 41 cuts off the pressure-medium supply. In the case of a transmission without a coupling pedal, the activation of the coupling takes place directly via the conduit III and 80, and the pilot valve 41 can be eliminated. At the two-position shift cylinder a hydraulic end-position damping device 84 of the generally known type is mounted, the action of this device being described in detail for instance in the HERION HANDBOOK No. 1, Edition 1969, pages 44–46.

Figure 2:
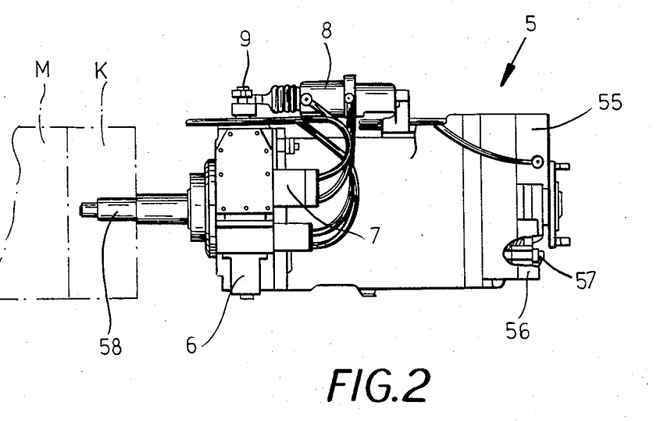
FIG. 2 a gear transmission as a multispeed transmission with the arrangements for speed selection, schematically represented.
Figure 3:
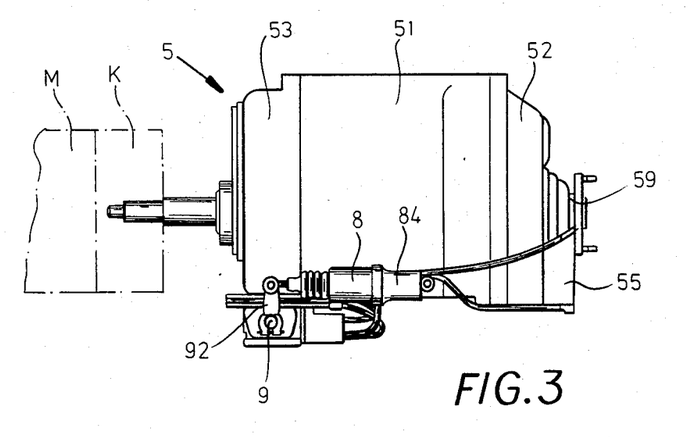
FIG. 3 a gear transmission according to FIG. 2 in another view.

The FIGS. 2 and 3 show the gear transmission 5 in a frontal view and a top view, with for instance the main transmission 51 having four gears, the auxiliary transmission 52 and the split transmission 53. In the area of the gear-shift-lever shaft 9, the two-position shift cylinder 8 with the damping device 84 are mounted, for the purpose of the shifting thereof-shift lever 92. The control block is also mounted laterally on the gear-shift-lever shaft 9 in its median area, while the three-position shift cylinder 6 is mounted as an extension of the gear-shift-lever shaft 9. The shift cylinders 55, 56 for the auxiliary transmission 52 and the split transmission 53, are as known, mounted close to the drive shaft 59, a tachometer, primarily an electronic tachometer 57 being also mounted in its vicinity. A coupling K or clutch connected with the engine as is also show.

Figure 4:
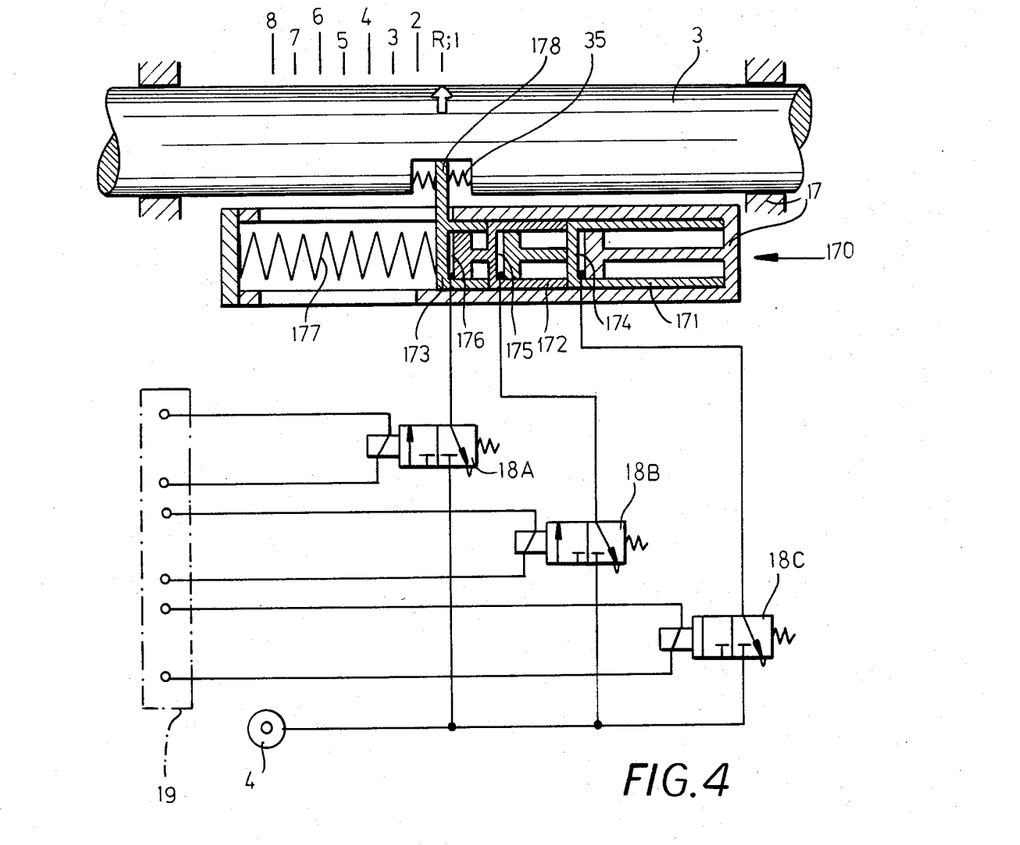
FIG. 4 a control diagram for the piston arrangement in the shift console.
Figure 8:
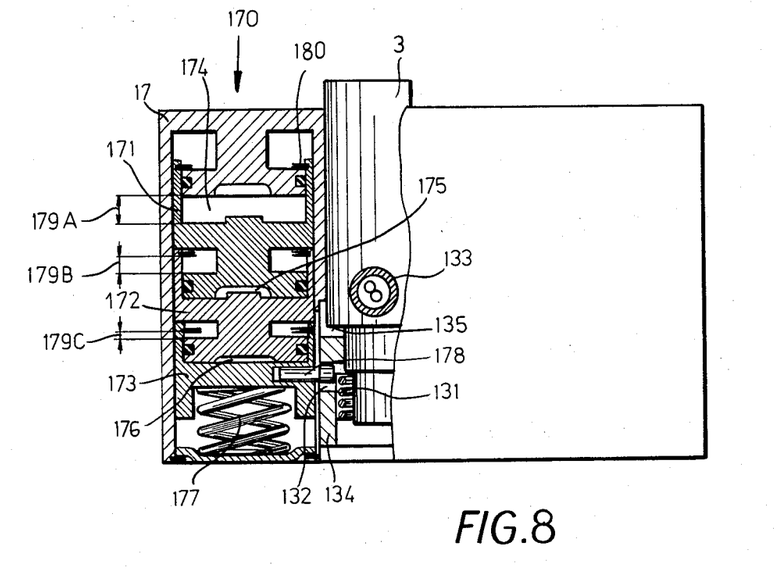
FIG. 8 shift console with piston arrangement, top-view and section.
Figure 9:
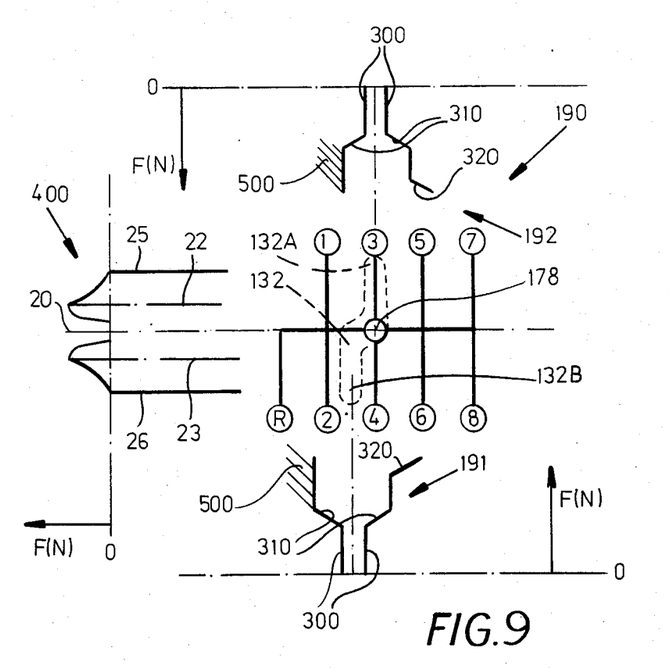
FIG. 9 shifting configuration with locking gate and representation of power thresholds in the shifting- and selection direction.

FIG. 4 shows the control diagram for the shift console 1 with the transmission shaft 3 with an indication of the axial displacement by a half path (one speed), so that to each drive gear corresponds to one position of this transmission shaft 3. The piston assembly 170 consists of three pistons 171, 172, 173 and three piston chambers 174, 175,176 and is constructed so that these positions of the transmission shaft are reached over the entrainment bolt 178 and the locking gate 132 (FIGS. 8 and 9). Pilot valves 18A, 18B, 18C correspond to the piston chambers and supply them or empty them of air. A pressure-medium source is marked 4 and the pilot valves are controlled, for instance based on the number of rotations, from an electronic block 19. The return of the pistons 171, 172, 173 takes place via a return spring 177, resting against the console housing 17. Between the entrainment bolt 178 fastened in the piston 173 and the transmission shaft 3 another spring mechanism 35 is mounted.

Figure 5:
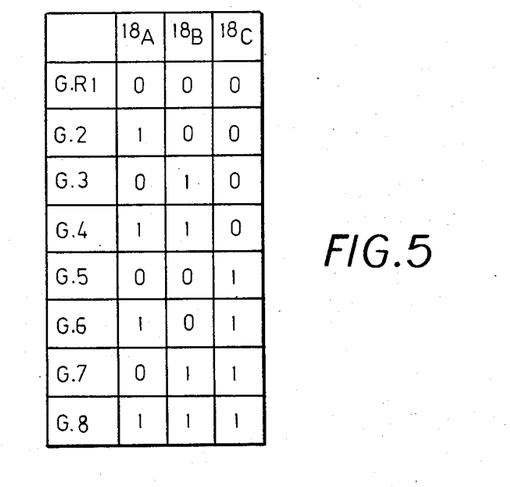
FIG. 5 a table of the connected switch valves, with reference to the available speeds.
Figure 6:
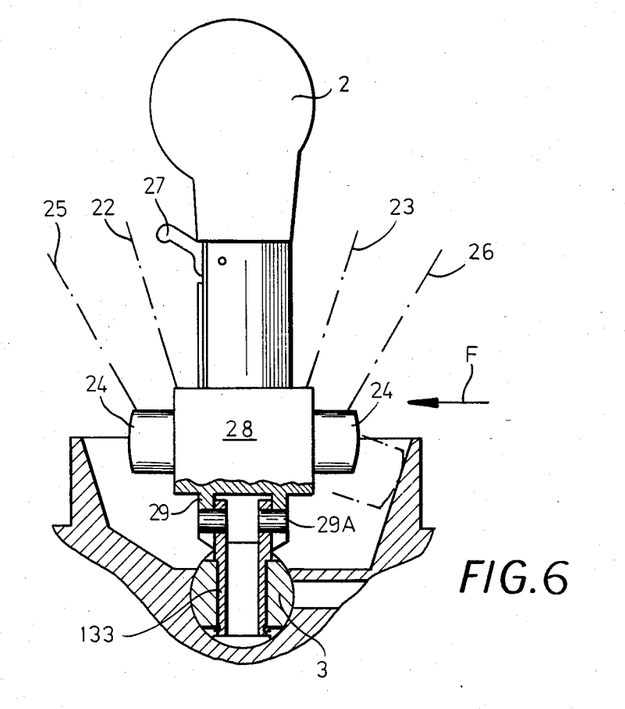
FIG. 6 shift console with speed selection lever in partial section.
Figure 7:
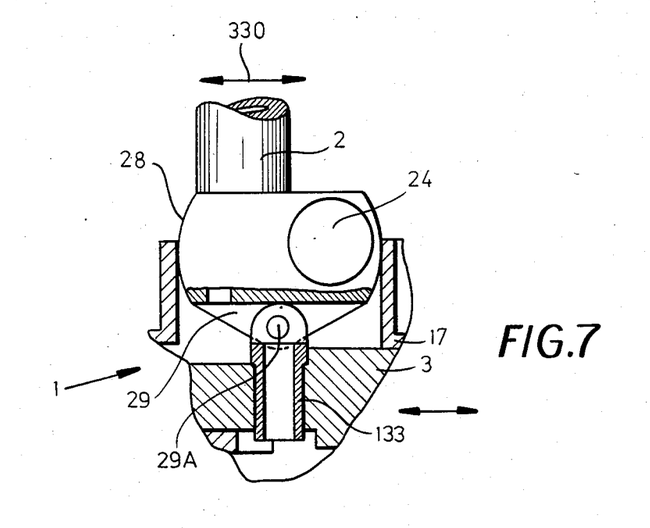
FIG. 7 shift console according to FIG. 6—a view in the travel direction.

In the table shown in FIG. 5 each of the pilot valves 18A, 18B, 18C set in supply position can be recognized, these valves leading to the displacement of the transmission shaft 3 in the half-pathes of gears 1 to 8. The reverse speed is identified at G.R. 1 the forward speeds at G.2 to G.8 and the open pressurizing valves 18A–18C by a "1" in the respective box while the closed venting valve for the respective speed is shown by a "0". FIGS. 6, 7 and 8 show one of the possible embodiments of a shift console 1. The gear-selection lever 2 is swingable around the center point of the transmission shaft 3 in the direction of the shift positions 22, 23 and in the gear end positions 25 and 26 of the gears, thereby twisting the transmission shaft 3 from the marked neutral position at an equal angle (FIG. 6). The selection of path takes place due to the rotation around the center point of a ball bearing 28 mounted on the speed selection lever and cooperates with a guide in the housing 17 of the shift console 1. When the speed selection lever 2 is actuated transversally to the direction of travel for the path selection, which as known, is possible only in the neutral position—the transmission shaft 3 is displaced in opposite direction over a forked joint (pin of forked joint 133, fork 29, pin 29A). Thereby, each path, as known in an H- or double H shifting arrangement, corresponds to one deflection of the gear-selection lever 2 in a selection position 330, while when departing from these known switching arrangements a gear corresponds to each path (FIG. 4). Another shift lever 27 is mounted on the gear-selection lever 2 for a reversal of the transmission from a performance-oriented layout of speed progression to an economically-oriented one, whereby over a shift cylinder 56 for instance, a group connected in series (split group) is interposed. A nonrotatable jacket 134 is also mounted on the transmission shaft 3 (FIG. 8), but this jacket is displaceable in each direction by a half path (=one gear) whereby the median position is reached without stress via a spring mechanism 131. In the jacket 134 another locking gate 132 is located, the entraining bolt 178 rigidly connected with the piston 173. This locking gate 132 is so shaped that only one gear can be selected departing from the neutral position to the shift position under the action of the shifting force, respectively either of the gears 1,3,5. . . or the gears R, 2,4. . . and that after the force of the spring mechanism 134 has been overcome in the selection direction also the two adjacent gears become connectable, and in the case of high-level shifting, after overcoming the force of the return spring 177, also further gears are connectable.

Shifting back for more than one speed is not possible because the movement of the transmission shaft 3 in this direction is hindered by the fact that the jacket 134 presses strongly against the frontal stop 135 on the transmission shaft 3, as well as by the pistons 171, 172, 173 in connection with a possible pressurization of the piston chambers 174, 175, 176 which would prevent such a movement due to the connection over the entrainment bolt 178.

The strokes 179A, B and C corresponding respectively to the pistons 171, 172, 173 when under pressure, are limited by the stops 180 and are so dimensioned that the biggest is four times and the medium is twice as big as the smallest stroke (binary coding).

The power levels—rest restoring forces do not correspond directly to the pathes in the shifting configuration, double H shifting configuration 190 (FIG. 9), as it is known to be the case (in German Utility Model No. 78 92 241, FIG. 3) so that the driver can sense the individual path in the entire configuration, but these forces are related to the respective position of the locking gate 132 and are displaced within the shifting configuration in accordance with the axial displacement of the locking gate. In the area of the neutral position the locking gate is offset and and covers two half pathes so one of the halves, for instance 132A is covered simultaneously with the half path, for instance from the neutral position to gear 3, while the second half path 132B extends from the neutral position to the gear position 4, but offset by half a path and thereby, for instance, lies between gear 4 and gear 2. These two halves, 132A and 132B of the locking gate 132 correspond also to the stop- and restoring forces 191, 192 so that, for instance in the represented position of the locking gate 132, in order to engage gear 3 no selection forces in axial direction are necessary.

As generally known, only when displacing the speed selection lever 2 from the neutral position 20 in a shifting position 22, 23 and after for instance the synchron is reached in the end positions 25,26 selection forces to overcome the force threshold 400 and the synchronizing force are required. But, for instance, if in this position of the locking gate 132 the gears 4, respectively 2, have to be engaged then also the first power thresholds 310 effective in both directions have to be overcome by the selection forces. The locking gate 132 is thereby displaced by a half a path in both shifting situations, which is made possible by the spring 131 between the jacket 134 and the transmission shaft 3 (FIG. 8). While in the ase of intended and accepted high-gear shiftings further force thresholds are to be overcome by corresponding selection forces, a further reverse shifting from the position locking gate 132 is prevented, because during shifting in high gear the restoring spring 177 can be overpressured, while in reverse shift direction the movement of the jacket 134 as well as of the transmission shaft 3 is arrested by the piston assembly. The axial displacement of the locking gate 132 takes place over the pressure supply dependent on the number of rotations to the piston chambers 174 to 176, in accordance with the table of FIG. 5, through the pilot valves 18A to 18C, which are switched in accordance with the number of rotations by orders received from an electronic block 19 (FIG. 4).

Figure 10:
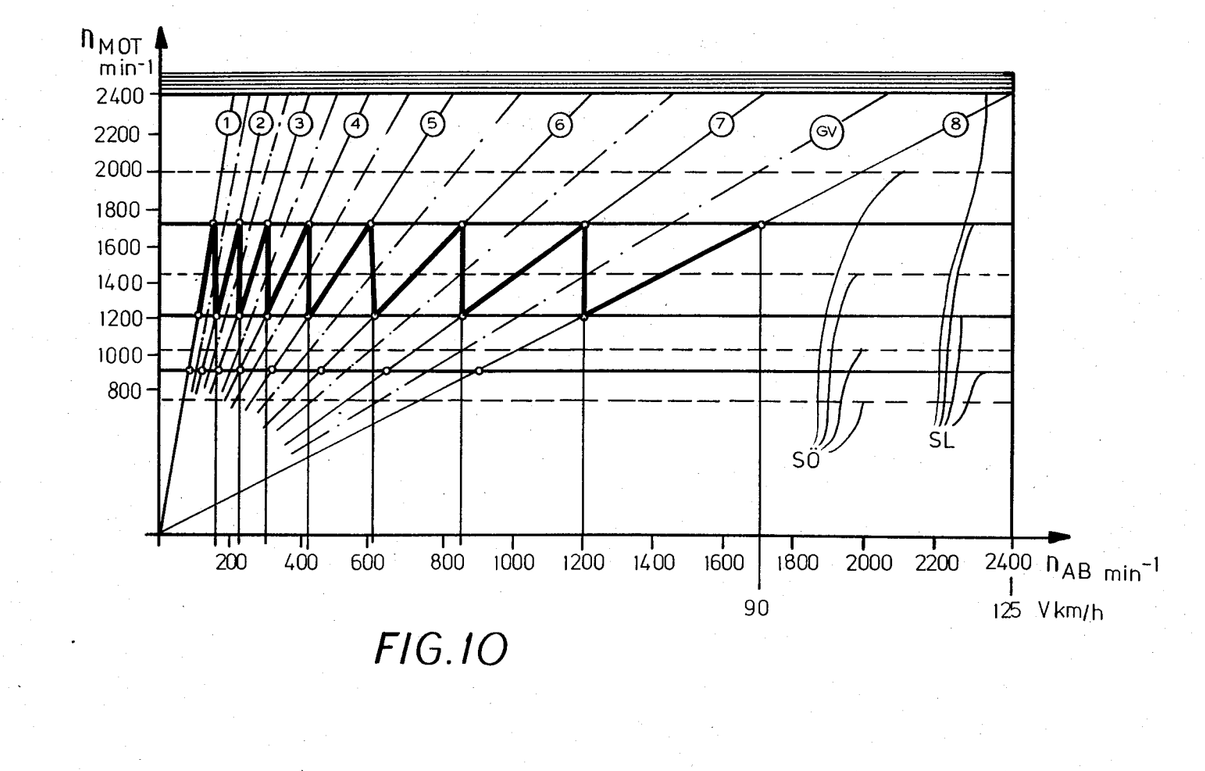
FIG. 10 diagram of speed of rotation.

In the situation of FIG. 9, gear 3 is recommended to the driver for shifting, whereby he does not even have to recognize the same, since he only has to perceive in which direction—travel or countertravel—the lowest shifting resistance is present. In the normal situation, the driver does not select one of eight speeds, but only one of two speeds. In addition, he has the possibility, as already described, to select the two adjacent gears 2 and 4, although by applying bigger forces. With the shift lever 27, the driver can connect in the known manner in addition the split group of the transmission, so that he also has the choice between an economy-oriented or a performance-oriented run. As can be seen from the simplified course diagram of FIG. 10, in the case of the performance-oriented run compared with the economy-oriented run, the switch points are displaced towards higher rotational speeds.

We claim:

1. In a multispeed transmission of a vehicle having in a shifting console a speed-selection lever having a speed-selection lever shaft and displaceable in a double-H pattern by a driver of the vehicle, a transmission shaft shiftable in response to said lever for path selection and gear shifting, respective control valves responsive to displacement of said shaft, transmission-operating cylinders connected with said valves and receiving a pressure medium upon operation of said valves by said transmission shaft, a clutch connected with said transmission, and feedback means for transmitting to said driver through said speed-selection lever a perceptible indication of instantaneous shift position of the transmission and for locking out gear-shifting operation while said clutch remains closed, the improvement wherein;

said transmission shaft is provided with a plurality of cams rotatable upon rotation of said shaft by said speed-selection lever;

said control valves include respective pairs of three-port/two-position valves actuated by each of said cams;

said control three-port/two-position valves are grouped in alignment parallel to an axis of said shaft for selective actuation for path selection and in circumferential alignment for gear shifting;

said cylinders include a three-position path selection cylinder and a two-position gear-shifting cylinder connected to said control three-port/two position valves;

a respective safety valve is provided between the three-position path selection cylinder and each said control three-port/two-position valve connected therewith to cooperate with said speed-selection lever shaft, said safety valve being open only in neutral position of said lever; and a respective further three-port/two position valve is provided between said two-position gear-shifting cylinder and each said control three-port/two position valve being connected therewith, said further three-port/two-position valves being operated by further cams on said speed-selection lever shaft for arresting said two-position shifting cylinder in a median position.

2. The improvement defined in claim 1 wherein said further three-port/two-position valves have pistons axially displaceable in a bore and urged radially outwardly by a compression spring but movable radially inwardly against the pressure of said spring and toward said further cams by a pressure medium passing respectively through the other of said further three-port/two position valves.

3. The improvement defined in claim 2 wherein each of said further cams has a plurality of steps and in said neutral position contact elements of said pistons of said further valves rest upon a transition section between steps of said further cams.

4. The improvement defined in claim 3 further comprising a two way valve between supply conduits to said two-position gear-shifting cylinder and directing said medium to a piston assembly provided on said speed-selection lever, said piston assembly blocking said lever in a respective shifting position until shifting in a gear box of said transmission is concluded.

5. The improvement defined in claim 1 wherein two three-port/two position valves circumferentially in succession are constructed and arranged to be open for flow passage only in said neutral position of said lever and to cut off flow of the pressure medium upon displacement of said lever into a shifting position.

6. The improvement defined in claim 1 wherein said speed selection lever shaft is displaced by said three-position selection cylinder into respective positions corresponding to three paths of a main transmission forming part of said multispeed transmission, two-piston chambers of said three-position cylinder being supplied with pressure medium for a median path.

7. The improvement defined in claim 6 wherein said three-position cylinder comprises a housing and a three-part piston having an inner piston part rigidly connected with said speed selection lever shaft and a collar of a larger diameter defining two piston parts axially displaceable on said inner piston part, each of said axially displaceable piston parts being prevented from movement in one displacement direction by a stop ring fixed to said speed housing.

8. The improvement defined in claim 7 further comprising two additional 3-port/2-position valves on said transmission shaft close to one another axially of said shaft for actuating an axial transmission forming part of said multispeed transmission with said main transmission via an auxiliary shifting cylinder.

9. The improvement defined in claim 8, further comprising a shifting valve for a splitter group where said multispeed transmission has a torque splitting group selection unit, said speed selection lever being provided with an additional shift lever for operating said shifting valve.

10. The improvement defined in claim 9, further comprising yet another three-port/two position valve between said control valves and a pressure medium source and permitting communication only upon actuation of said clutch.

11. The improvement defined in claim 4, wherein between said two way valve and said piston assembly, an additional conduit is provided for effecting actuation of said clutch.

12. The improvement defined in claim 1, further comprising an additional piston assembly in said console operable in dependence upon a parameter of travel of the vehicle for selecting an optimal speed and path for a given travel instant selectable by the driver.

* * * * *